United States Patent [19]
Tsuchida

[11] Patent Number: 5,956,732
[45] Date of Patent: Sep. 21, 1999

[54] SOFTWARE SYSTEM MANAGEMENT DEVICE FOR MAINTAINING REVISIONS OF A SOURCE CODE

[75] Inventor: Hiroyuki Tsuchida, Tokyo, Japan

[73] Assignee: NEC Corporation, Tokyo, Japan

[21] Appl. No.: 08/884,574

[22] Filed: Jun. 27, 1997

Related U.S. Application Data

[63] Continuation of application No. 08/394,629, Feb. 27, 1995, abandoned.

[30] Foreign Application Priority Data

Feb. 28, 1994 [JP] Japan .................................. 6-055126

[51] Int. Cl.$^6$ ...................................................... G06F 17/30
[52] U.S. Cl. ............................ 707/203; 707/10; 707/200; 707/204
[58] Field of Search .................................. 395/601, 616, 395/619, 701, 703, 712; 707/200, 203, 204, 10

[56] References Cited

U.S. PATENT DOCUMENTS

| | | | |
|---|---|---|---|
| 4,558,413 | 12/1985 | Schmidt et al. ........................ | 364/300 |
| 4,809,170 | 2/1989 | Lablang et al. ......................... | 364/200 |
| 4,951,192 | 8/1990 | Chase, Jr. et al. ...................... | 364/200 |
| 5,159,687 | 10/1992 | Richburg ................................ | 395/700 |
| 5,278,979 | 1/1994 | Foster et al. ........................... | 395/600 |

FOREIGN PATENT DOCUMENTS

| | | |
|---|---|---|
| 63-273132 | 11/1988 | Japan . |
| 1228025 | 9/1989 | Japan . |
| 2-47718 | 2/1990 | Japan . |
| 4-199352 | 7/1992 | Japan . |
| 4263362 | 9/1992 | Japan . |
| 4-364530 | 12/1992 | Japan . |
| 5-88867 | 4/1993 | Japan . |
| 5-334151 | 12/1993 | Japan . |

OTHER PUBLICATIONS

Ramamoorthy, "The Evolution Support Environment System", Nov. 1990, IEEE Transactions on Software Engineering, vol. 16, No. 11.

Ambriola, "The Evolution of Configuration Management and Version Control", Nov. 1990, Software Engineering Journal.

Japanese Office Action dated Mar. 24, 1998, and partial translation thereof.

*Primary Examiner*—Thomas G. Black
*Assistant Examiner*—Donald Min
*Attorney, Agent, or Firm*—McGinn & Gibb, P.C.

[57] ABSTRACT

A software management system is provided which enables the configuration of a software system to be checked on a specification level and the difference between two software systems to be identified easily. A system name and a system revision for each client to which the system has been released as well as a specification name and a specification revision for each system revision are registered in a configuration storage. And the name, all of the existing revisions and contents of each specification are registered in a specification storage. A data reference means outputs the contents of the configuration storage or the specification storage to a display device according to a data reference request from an input device such as a keyboard, and also outputs the difference in the name and revision of the specifications of two software systems input from the input device, and/or the contents of the specifications.

25 Claims, 22 Drawing Sheets

| SYSTEM NAME | SYSTEM REVISION | SPECIFICATION NAME | SPECIFICATION REVISION |
|---|---|---|---|
| COMPANY A PRODUCT DELIVERY SYSTEM | R1.1 | RECEPTION SCREEN SPEC. | R2.1 |
| | | RECEPTION PROCESSING SPEC. | R1.3 |
| | | DELIVERY SCREEN SPEC. | R3.1.2 |
| | R2.1 | RECEPTION SCREEN SPEC. | R3.1 |
| | | RECEPTION PROCESSING SPEC. | R2.3 |
| | | DELIVERY SCREEN SPEC. | R3.1.2 |
| | | CAR ALLOCATION SCREEN SPEC. | R1.1 |
| | | CAR ALLOCATION MAP SPEC. | R1.1 |
| COMPANY B PRODUCT DELIVERY SYSTEM | R1.1 | RECEPTION SCREEN SPEC. | R3.1 |
| | | RECEPTION PROCESSING SPEC. | R1.4 |
| | | ACCEPTANCE SCREEN SPEC. | R1.1 |
| | | DELIVERY SCREEN SPEC. | R3.1.2 |
| | R2.1 | RECEPTION SCREEN SPEC. | R3.1 |
| | | RECEPTION PROCESSING SPEC. | R1.4 |
| | | ACCEPTANCE SCREEN SPEC. | R2.1 |
| | | DELIVERY SCREEN SPEC. | R3.1.2 |

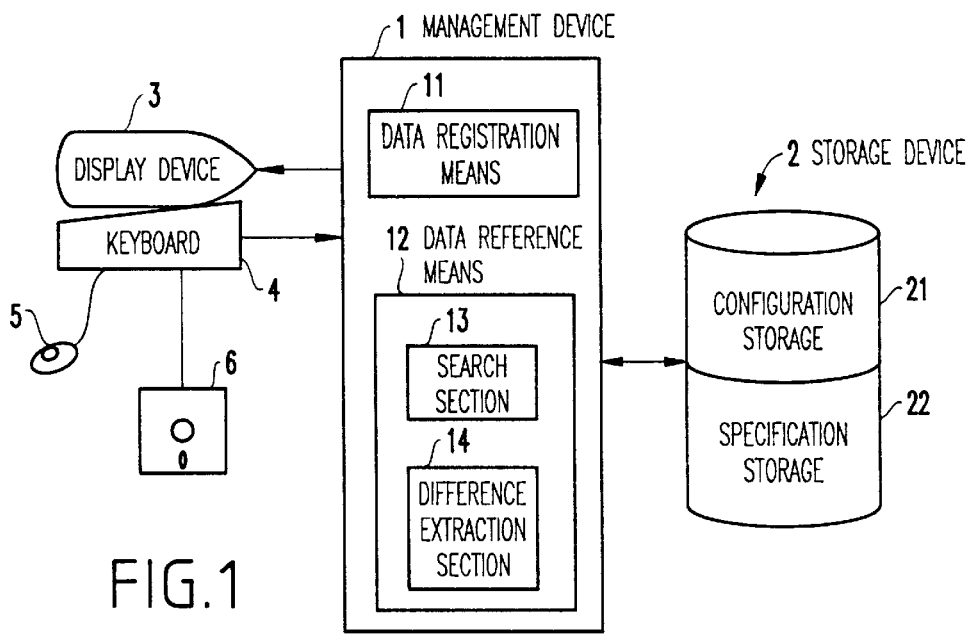

FIG.1

| SYSTEM NAME | SYSTEM REVISION | SPECIFICATION NAME | SPECIFICATION REVISION |
|---|---|---|---|
| COMPANY A PRODUCT DELIVERY SYSTEM | R1.1 | RECEPTION SCREEN SPEC. | R2.1 |
| | | RECEPTION PROCESSING SPEC. | R1.3 |
| | | DELIVERY SCREEN SPEC. | R3.1.2 |
| | R2.1 | RECEPTION SCREEN SPEC. | R3.1 |
| | | RECEPTION PROCESSING SPEC. | R2.3 |
| | | DELIVERY SCREEN SPEC. | R3.1.2 |
| | | CAR ALLOCATION SCREEN SPEC. | R1.1 |
| | | CAR ALLOCATION MAP SPEC. | R1.1 |
| COMPANY B PRODUCT DELIVERY SYSTEM | R1.1 | RECEPTION SCREEN SPEC. | R3.1 |
| | | RECEPTION PROCESSING SPEC. | R1.4 |
| | | ACCEPTANCE SCREEN SPEC. | R1.1 |
| | | DELIVERY SCREEN SPEC. | R3.1.2 |

FIG.2

| SPECIFICATION NAME | SPECIFICATION REVISION | CONTENTS OF SPECIFICATION |
|---|---|---|
| RECEPTION SCREEN SPECIFICATION | R1.1 | |
| | R2.1 | |
| | R3.1 | |
| RECEPTION PROCESSING SPECIFICATION | R1.1 | |
| | R1.2 | |
| | R1.3 | |
| | R1.4 | |
| DELIVERY SCREEN SPECIFICATION | R1.1 | |
| | R2.1 | |
| | R3.1 | |
| | R3.1.2 | |
| CAR ALLOCATION SCREEN SPECIFICATION | R1.1 | |
| CAR ALLOCATION MAP SPECIFICATION | R1.1 | |
| ACCEPTANCE SCREEN SPECIFICATION | R1.1 | |

| COMPANY B PRODUCT DELIVERY SYSTEM | R2.1 | RECEPTION SCREEN SPEC. | R3.1 |
|---|---|---|---|
| | | RECEPTION PROCESSING SPEC. | R1.4 |
| | | ACCEPTANCE SCREEN SPEC. | R2.1 |
| | | DELIVERY SCREEN SPEC. | R3.1.2 |

FIG.6

| SYSTEM NAME | SYSTEM REVISION | SPECIFICATION NAME | SPECIFICATION REVISION |
|---|---|---|---|
| COMPANY A PRODUCT DELIVERY SYSTEM | R1.1 | RECEPTION SCREEN SPEC. | R2.1 |
| | | RECEPTION PROCESSING SPEC. | R1.3 |
| | | DELIVERY SCREEN SPEC. | R3.1.2 |
| | R2.1 | RECEPTION SCREEN SPEC. | R3.1 |
| | | RECEPTION PROCESSING SPEC. | R2.3 |
| | | DELIVERY SCREEN SPEC. | R3.1.2 |
| | | CAR ALLOCATION SCREEN SPEC. | R1.1 |
| | | CAR ALLOCATION MAP SPEC. | R1.1 |
| COMPANY B PRODUCT DELIVERY SYSTEM | R1.1 | RECEPTION SCREEN SPEC. | R3.1 |
| | | RECEPTION PROCESSING SPEC. | R1.4 |
| | | ACCEPTANCE SCREEN SPEC. | R1.1 |
| | | DELIVERY SCREEN SPEC. | R3.1.2 |
| | R2.1 | RECEPTION SCREEN SPEC. | R3.1 |
| | | RECEPTION PROCESSING SPEC. | R1.4 |
| | | ACCEPTANCE SCREEN SPEC. | R2.1 |
| | | DELIVERY SCREEN SPEC. | R3.1.2 |

FIG.7

| SPECIFICATION NAME | SPECIFICATION REVISION | CONTENTS OF SPECIFICATION |
|---|---|---|
| RECEPTION SCREEN SPECIFICATION | R1.1 | |
| | R2.1 | |
| | R3.1 | |
| RECEPTION PROCESSING SPECIFICATION | R1.1 | |
| | R1.2 | |
| | R1.3 | |
| | R1.4 | |
| DELIVERY SCREEN SPECIFICATION | R1.1 | |
| | R2.1 | |
| | R3.1 | |
| | R3.1.2 | |
| CAR ALLOCATION SCREEN SPECIFICATION | R1.1 | |
| CAR ALLOCATION MAP SPECIFICATION | R1.1 | |
| ACCEPTANCE SCREEN SPECIFICATION | R1.1 | |
| | R2.1 | |

FIG.18A
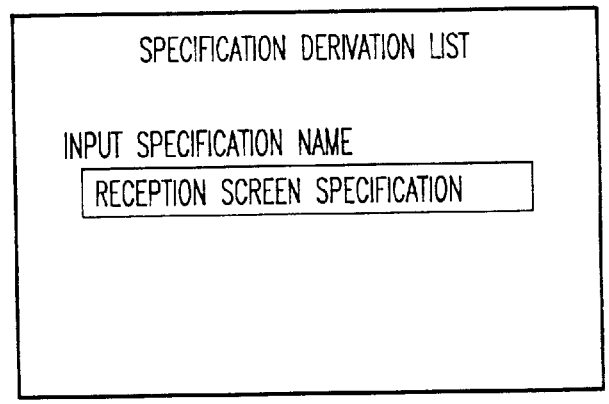
FIG.18.B
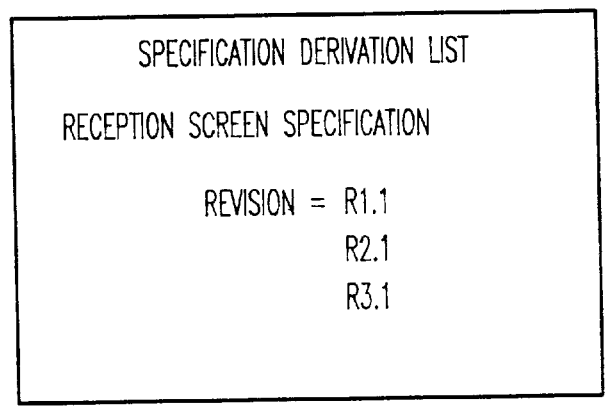

| NAME OF PROGRAM: EXM60 | REV: 068 | DEFINITION OF ACTIONS |
|---|---|---|

| JOIN SEARCH | | | |
|---|---|---|---|
| IN | | NAME OF INPUT FILE | TOUR MASTER FILE |
| | | NAME OF INPUT DESCRIPTION | |
| | UPDATE | NAME OF OUTPUT DESCRIPTION | |
| FILE | | NAME OF MASTER FILE | DEPARTURE FILE |
| | | SEARCH DESCRIPTION | KEY M-TOUR CODE DUP |
| AT INIT | | INVOKED PROCEDURE | |
| | | DESCRIPTION OF OPERATION | |
| AT SEARCH | | INVOKED PROCEDURE | |
| | | DESCRIPTION OF OPERATION | |
| AT MAIN | | INVOKED PROCEDURE | |
| | | DESCRIPTION OF OPERATION | |
| WHEN | | CONDITION | %SEARCH(DEPARTURE FILE) = 2 |
| | OUT | NAME OF OUTPUT FILE | WORK FILE |
| | | NAME OF OUTPUT DESCRIPTION | WORK FILE OUTPUT |

| REPORT | | |
|---|---|---|
| IN | NAME OF INPUT FILE | WORK FILE |
| OUT | NAME OF OUTPUT FILE | REPORT FILE |
| | NAME OF OUTPUT FORMAT | LIST |

FIG.29

| TITLE: PROGRAM SPEC. TOUR LIST OUTPUT PROGRAM | DATE 92.10.30 | VER. 068 | REGISTRATION NUMBER | |
|---|---|---|---|---|
| | | | AUTHOR | |
| NAME OF PROGRAM: EXM60 | REV: 068 | NAME OF OUTPUT FILE: OUTPUT OF WORK FILE | | NAME OF FILE: WORK FILE |ತ

| INITIAL PROCESSING | |
|---|---|
| NAME OF RECORD | WORK FILE |
| PROCEDURE | |
| CONDITION | |

| NO. | NAME OF ITEMS | OUTPUT PROCESSING |
|---|---|---|
| 0001 | W-TOUR CODE | M-TOUR CODE |
| 0002 | W-TOUR NAME | M-TOUR NAME |
| 0003 | W-OPTION NAME 1 | M-OPTION NAME 1 |
| 0004 | W-OPTION NAME 2 | M-OPTION NAME 2 |
| 0005 | W-OPTION NAME 3 | M-OPTION NAME 3 |
| 0006 | W-OPTION NAME 4 | M-OPTION NAME 4 |
| 0007 | W-OPTION NAME 5 | M-OPTION NAME 5 |
| 0008 | W-DEPARTURE DATE | F-DEPARTURE DATE |
| 0009 | W-OP 1 PERSON | F-OP 1 PERSON |
| 0010 | W-OP 2 PERSON | F-OP 2 PERSON |
| 0011 | W-OP 3 PERSON | F-OP 3 PERSON |
| 0012 | W-OP 4 PERSON | F-OP 4 PERSON |
| 0013 | W-OP 5 PERSON | F-OP 5 PERSON |

| TERMINATE PROCESSING | |
|---|---|

FIG.30

| NAME OF PROGRAM: EXM60 | REV: 068 | DATE TYPE: PROGRAM INFORMATION | NAME OF FILE: REPORT FILE |
|---|---|---|---|
| 000001 TFILE      REPORT FILE<br>000002      DEV LIST<br>000003      APPLY SHIFT-CODE PPR-1<br>000004 ||||
| NAME OF PROGRAM: EXM60 | REV: 068 | DATE TYPE: PROGRAM INFORMATION | NAME OF FILE: WORK FILE |
| 000001 TFILE     WORK FILE WORK<br>000002<br>000003    01  WORK RECORD.<br>000004    02  W-TOUR CODE     PIC X(6).<br>000005    02  W-TOUR NAME     PIC N(20).<br>000006    02  W-OPTION NAME 1  PIC N(10).<br>000007    02  W-OPTION NAME 2  PIC N(10).<br>000008    02  W-OPTION NAME 3  PIC N(10).<br>000009    02  W-OPTION NAME 4  PIC N(10).<br>000010    02  W-OPTION NAME 5  PIC N(10).<br>000011    02  W-DEPARTURE DATE PIC 9(4).<br>000012    02  W-OP 1 PERSON    PIC 9(3).<br>000013    02  W-OP 2 PERSON    PIC 9(3).<br>000014    02  W-OP 3 PERSON    PIC 9(3).<br>000015    02  W-OP 4 PERSON    PIC 9(3).<br>000016    02  W-OP 5 PERSON    PIC 9(3). ||||
| NAME OF PROGRAM: EXM60 | REV: 068 | DATE TYPE: PROGRAM INFORMATION | NAME OF FILE: TOUR MASTER |
| 000001 TFILE      TOUR MASTER<br>000002     DEV     M1TOUR(RDB)<br>000003     KEY     M-TOUR CODE<br>000004     ACCESS  DYNAMIC<br>000005     ORG     INDEXED<br>000006<br>000007 COPY MTOURC. ||||
| NAME OF PROGRAM: EXM60 | REV: 068 | DATE TYPE: PROGRAM INFORMATION | NAME OF FILE: DEPARTURE FILE |
| 000001 TFILE<br>000002     DEV      FDEPT(RDB)<br>000003     KEY      F-TOUR CODE<br>000004     ACCESS   DYNAMIC<br>000005     OPENMODE INPUT<br>000006     ORG      INDEXED<br>000007<br>000008 COPY FIDEPTC. ||||

FIG.31

* INQUIRY OF THE NUMBER OF THE STOCK *

PRODUCT NAME    [CCCCCCCCCCCCCCCCCCCCCCC]

PRODUCT CODE    [NNNNNNNNNNNNNN]

STOCK NUMBER    [NNNN]

① INPUT PRODUCT NAME AND PRODUCT CODE.
② PUSH ENTER KEY

FIG.32

SOFTWARE SYSTEM MANAGEMENT DEVICE FOR MAINTAINING REVISIONS OF A SOURCE CODE

This application is a continuation of application Ser. No. 08/394,629, filed Feb. 27, 1995, and now abandoned.

BACKGROUND OF THE INVENTION

The present invention relates to software management device, and more particularly to a device for managing specifications of source programs composing software systems.

A software system is composed of a plurality of source programs. For example, a product delivery system may be composed of a source program for displaying a reception screen, a source program for processing a reception process, and a source program for displaying a delivery screen. Source programs are produced separately, and then they are compiled and linked together to produce the software system.

A programmer produces a source program according to a document so called a program specification (hereinafter simply referred to as a specification). The specification includes a detailed statement of the data available for processing, the required outputs and so on. Examples of a program specifications are shown in "Encyclopedia of computer science and engineering, second edition", Van Nostrand Reinhold Company, New York, 1983, pp. 570–574.

The specifications are described in formats that are easy to understand such as a table. The specifications are saved even after the system is released and referred to for debugging or upgrading the software system.

Software manufacturers often produce a software system by slightly modifying a prior software system. They also release new versions of a software system to the same customer one after another. Thus, there are many variations of software systems of the same type and, therefore, there are many variations of the specifications of the software system.

For identifying a software system from other software systems of the same type, a system name and a system revision number are given to each software system. For example, the system name identifies the client to which the software system was released. The system revision number (hereinafter referred to as system revision) identifies the version of a software systems that has the same system name.

The details of functions of a software system can be examined by looking through specifications of the software system. However, this task is apt to fall into difficulty because, once the system is released, it is often difficult to know the correspondence between software systems and specifications.

The difference between first and second software systems can be examined by comparing the specifications of the first and second software systems. However, this task is also apt to fall into difficulty because the volumes of the specifications are huge.

SUMMARY OF THE INVENTION

Therefore, one object of the present invention is to provide a software management device for examining the correspondence between software systems and specifications.

Another object of the present invention is to provide a software management device for examining the difference of two or more software systems.

According to the present invention, a software management device is connected to an input device, an output device and a memory. The memory includes a configuration storage.

When the management device receives a data registration command from the input device, the management device registers data in the configuration storage of the memory according to information input from the input device.

The management device stores in the configuration storage a system identifier and a specification identifier corresponding to the system identifier when a source program identified by the specification identifier is included in a system identified by the system identifier.

When the management device receives a data reference command from the input device, the management device outputs specification information to the output device in response to the data reference command.

When the "system configuration" function is chosen by the data reference command, the management device receives a system identifier from the input device. The management device reads from the configuration storage a specification identifier corresponding to the input system identifier. And then, the management device outputs the specification identifier to the output device.

When the "system derivation list" function is chosen by the data reference command, the management device receives a system name from the input device. The management device reads from the configuration storage a system identifier including the input system name and outputs a system revision included in the system identifier to the output device.

When the "specification derivation list" function is implemented, the memory includes a specification storage for storing the specification identifier. When the "specification derivation" function is chosen by the data reference command, the management device receives a specification name from the input device. The management device reads from the specification storage a specification identifier including the specification name and outputs a specification revision included in the specification identifier to the output device.

When the "system search" function is chosen by the data reference command, the management device receives a specification identifier. The management devices reads from the configuration storage a system identifier corresponding to the specification identifier and outputs the system identifier to the output device.

When the "difference extraction" function is chosen by the data reference command, the management device receives first and second system identifiers of first and second software systems from the input device. The management device reads from the configuration storage a first group of specification identifiers corresponding to the first system identifier. The management device reads from the configuration storage a second group of specification identifiers corresponding to the second system identifier. The management device compares specification identifiers included in the first and second groups for determining a difference between the first and second groups. The management device outputs the difference between the first and second groups to the output device.

The management device outputs a specification identifier included in both the first and second groups with a comment stating that the first and second software systems include identical source programs.

The management device outputs a specification identifier included only in the first group with a comment stating that a source program corresponding to the specification identifier is added to the first software system.

The management device outputs a first specification identifier in the first group when the second group includes a specification identifier including the same specification name as the first specification identifier but including different specification name. The first specification identifier is output with a comment stating that the first and second software system include different versions of a source program.

The memory may have a specification storage for storing the specification identifier and a content of a specification identified by the specification identifier. In this configuration, the management device reads, from the specification storage, a content of a specification and outputs the content to the output device.

BRIEF DESCRIPTION OF THE DRAWINGS

Other objects, features and advantages of the present invention will become more apparent when the following description is read in conjunction with the accompanying drawings, wherein:

FIG. 1 is a block diagram of a software management device according to a first embodiment of the present invention.

FIG. 2 shows an example of the contents of the configuration specification information section 21.

FIG. 6 shows an example of a system configuration received by the data registration means 11.

FIG. 7 shows an example of the contents of the configuration storage 21 updated by the data registration means 11.

FIG. 14 is a flowchart illustrating the processing of the search section 13 when the menu item "system derivation list" is selected.

FIGS. 18(a) and 18(b) show examples of screen images displayed in the steps 61 and 63 in FIG. 17, respectively.

FIGS. 28–32 show examples of specifications.

In these drawings, the same reference numerals depict the same parts, respectively.

DETAILED DESCRIPTION OF THE PREFERRED EMBODIMENTS

Figures 3, 4:
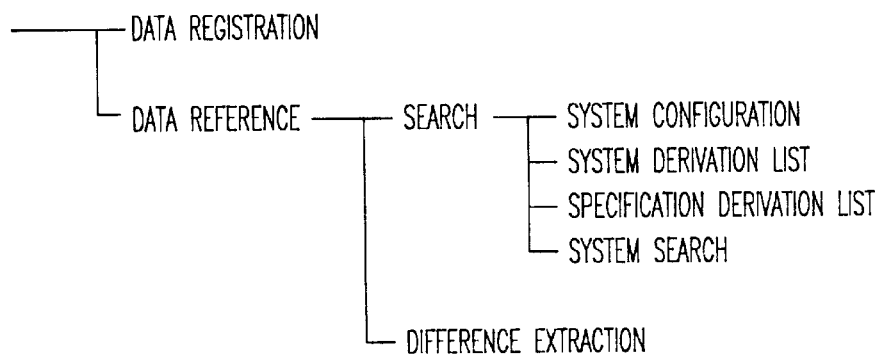
FIG. 3 shows an example of the contents of the revision management information section 22.
FIG. 4 shows the structure of commands of the software management device.

Referring to FIG. 1, the software management device 1 according to the first embodiment of the present invention is a programmed digital computer. The management device 1 comprises data registration means 11 and data reference means 12. The data reference means 12 comprises a search section 13 and a difference extraction section 14. The data registration means 11 and the data reference means 12 are modules of computer programs. The operations of the data registration means 11 and the data reference means 12 are described below.

The management device is connected to a display device 3, a keyboard 4, a pointing device 5, a floppy disk 6 and a storage device 2.

The storage device 2 has a configuration storage 21 and a specification storage 22.

Referring to FIG. 2, the configuration storage 21 stores system configurations of released software systems.

In this specification, a system configuration of a software system means a combination of a system name and a system revision of the software system, and specification names and specification revisions of specifications of source programs composing the software systems.

As explained above, a combination of the system name and the system revision identifies a software system among many versions of the software system.

The specification name and the specification revision are identifiers of a specification. A combination of the specification name and the specification revision identifies a specification among other specifications.

The specification names describe the function of the source program produced according to the specification. The specification revisions identify the version of the specification. In this embodiment, a specification corresponds to a source program on a one-to-one basis.

In the example in FIG. 2, the configuration storage 21 stores "Company A product delivery system" and "Company B product delivery system" as system names.

There are two versions of the company A product delivery system identified by the system revision "R1.1" and "R2.1", respectively. There is only one version of the company B product delivery system identified by the system revision "R1.1".

The company A product delivery system version R1.1 is composed of three source programs. The three source programs correspond to a reception screen specification version R2.1, a reception processing specification version R1.3, and a delivery screen specification version R3.1.2, respectively.

The company A product delivery system version R2.1 is composed of five source programs. The five source programs correspond to a reception screen specification version R3.1, a reception processing specification version R2.3, delivery screen specification version R3.1.2, a car allocation screen specification version R1.1, and a car allocation map specification version R1.1, respectively.

The company B product delivery system version R1.1 is composed of four source programs. The four source programs correspond to a reception screen specification version R3.1, a reception processing specification version R1.4, a acceptance screen specification R1.1, and a delivery screen specification R3.1.2, respectively.

Referring to FIG. 3, the specification storage 22 stores the specification names, specification revisions, and the contents of each specification.

In the example of FIG. 3, "Reception screen specification", "Reception processing specification", "Delivery screen specification", "Car allocation screen specification", "Car allocation map screen specification" and "acceptance screen specification" are stored as system names in the specification storage 22.

The specification storage 22 stores three versions of the reception screen specification that are identified by the specification revisions of "R1.1", "R2.1" and "R3.1", respectively.

The specification storage 22 stores four versions of the reception processing specification that are identified by the specification revisions of "R1.1", "R1.2", "R1.3" and "R1.4", respectively.

The specification storage 22 stores four versions of the delivery screen specification that are identified by the specification revisions of "R1.1", "R2.1", "R3.1" and "R3.1.2".

The specification storage 22 stores the version "R1.1" of car allocation screen specification, car allocation map specification and acceptance screen specification.

Next, the operation of the management device 1 is described.

Referring to FIG. 4, the management device 1 accepts a "data registration" command or a "data reference" command. When the operator inputs the data reference command, he chooses one of "search" and "difference extraction" functions. When the operator chooses "search", he chooses one of "system configuration", "system derivation list", "specification derivation list" and "system search" functions.

The data registration command is executed by the data registration means 11. The data reference command is executed by the data reference means 12. Especially, the data reference command is executed by the search section 13 of the data reference means 12 when "search" is chosen by the operator. The data reference command is executed by the difference extraction section 14 of the data reference means 12 when "data extraction" is chosen by the operator.

Next, the operation of the data registration means 11 is described.

When a system is released, the operator inputs the data registration command to update the contents of the configuration storage 21 and the specification storage 22. When the data registration command is input, the data registration means 11 requests the operator to input the system configuration of the newly released system and the contents of the specifications of the system. Receiving the system configuration and the contents of the specification via key board 4 or floppy disk drive 6, the data registration means 11 update the contents of the configuration storage 21 and the specification storage 22.

Figure 5:
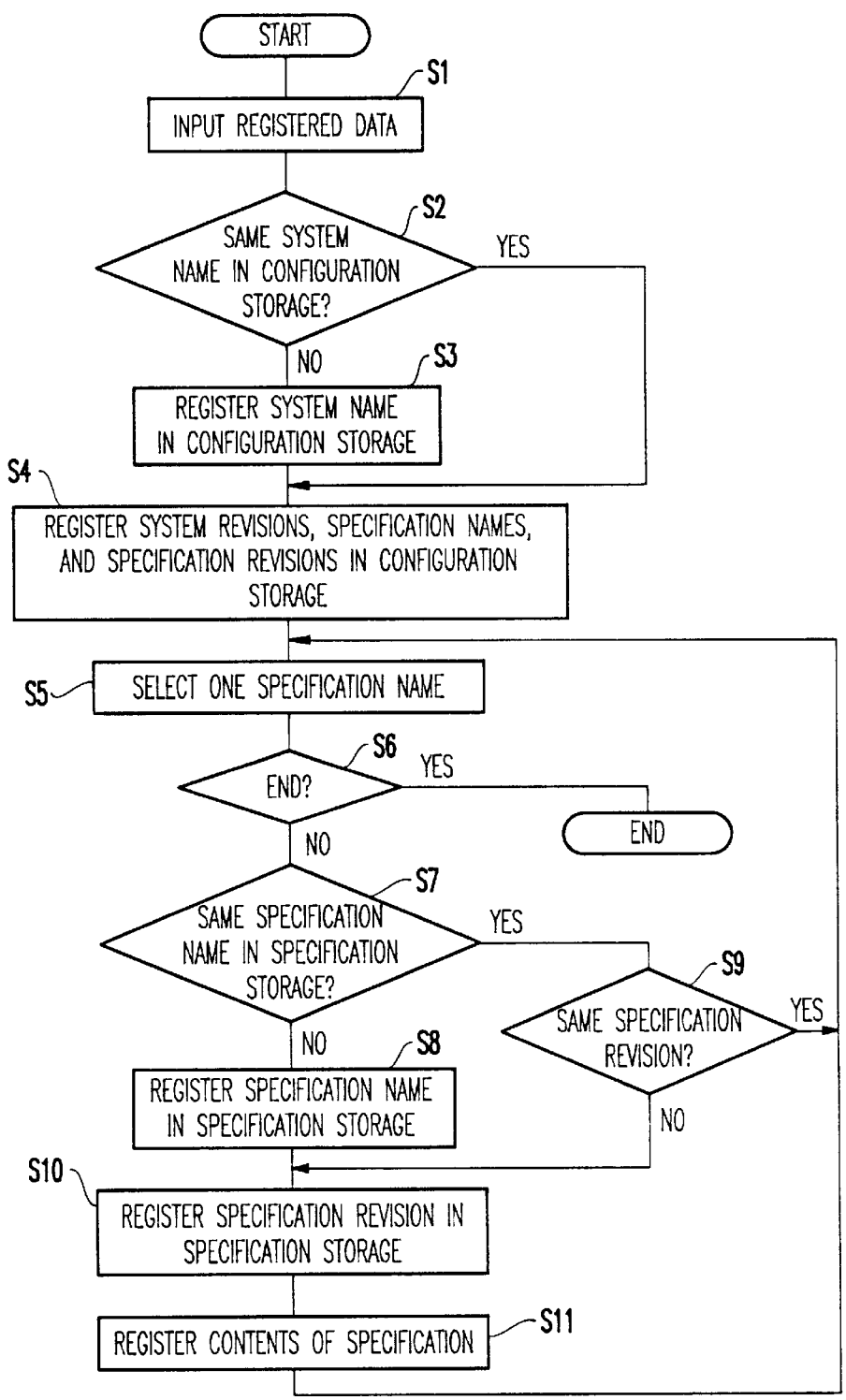
FIG. 5 is a flowchart illustrating the processing of the data registration means 11.

Next, a more detailed operation of the data registration means 11 is described referring to FIG. 5. In the steps 1 to 4 and 5 to 11, the data registration means 11 updates the configuration storage 21 and the specification storage 22, respectively.

Referring to FIG. 5, in the first step, the data registration means 11 receive a system configuration and contents of specifications. As state earlier, the system configuration of a software system includes a system name and a system revision of the system, and a specification names and specification revisions of the specifications of source programs composing the software system.

In the second step, the data registration means 11 determines whether the same system name as the received one is stored in the configuration storage 21 or not. When the same system name exists in the configuration storage 21, the data registration means 11 skips the step 3 and executes the step 4. When the same system name does not exist in the configuration storage 21, the data registration means 11 executes the step 3.

In step 3, the data registration means 11 registers the system name in the configuration storage 21.

In step 4, the data registration means 11 registers the received system revision, specification names and specification revisions into the configuration storage 21. The data registration means 11 establish the correspondence of the system name already registered with the system revisions, the specification names and the specification revisions registered.

In step 5, the data registration means 11 selects one specification name among those received in the step 1.

In step 6, the data registration means 11 determines whether all the specification name has already been selected and no more specification name can be selected in step 5 or not. If so, the data registration means 11 terminates its operation. If not, the data registration means 11 executes step 7.

In step 7, the data registration means determines whether the same specification name as the selected one exists in the specification storage 22. If the selected specification name exists, the data registration means 11 executes the step 9. If the selected specification name does not exist, the data registration means 11 execute step 8.

In step 8, the data registration means 11 registers the selected specification name in the specification storage 22.

In step 9, the data registration means 11 determines whether the specification revision registered in the specification storage 22 is the same as that of the selected specification name or not. When they are the same, the data registration means 11 executes the step 6 again. When they are different from each other, the data registration means 11 executes step 10.

In step 10, the data registration means 11 registers the specification revision of the selected specification name in the specification storage 22. The data registration means 11 establishes the correspondence of the specification name registered in the specification storage 22 with the specification revision.

In step 11, the data registration means 11 registers the contents of the specification identified by the specification name into the specification storage 22. The data registration means 11 establishes the correspondence of the specification name with the contents of the specification.

After executing step 11, the data registration means 11 executes the step 6 again.

Steps 8 to 11 are executed with respect to all specification names in the received system configuration.

Figures 8, 9:
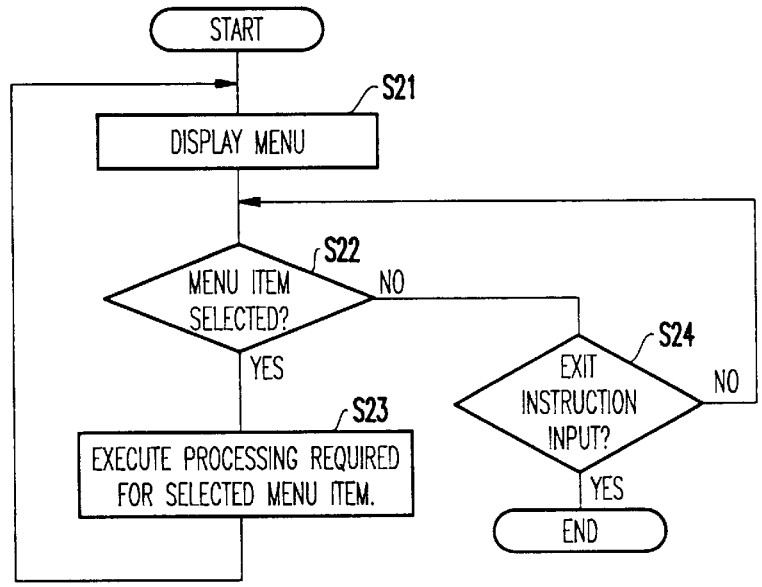
FIG. 8 shows an example of the contents of the specification storage 22 updated by the data registration means 11.
FIG. 9 is a flowchart illustrating an example of the processing of the data reference means 12.

Next, an example of the operation of the data registration means 11 is described referring to FIGS. 6 to 8.

Assume the case that the data registration means 11 receive data shown in FIG. 6 as a system configuration, and the configuration storage 21 and the specification storage 22 store the data shown in FIGS. 2 and 3, respectively.

In this case, the data registration means 11 skips step 3 because the received system name "Company B product delivery system" exists in the configuration storage 21 as depicted in FIG. 2. Therefore, the data registration means 11 registers the system revision, the specification names and the specification revisions in the configuration storage 21 in step 4. The contents of the configuration storage 21 is updated as shown in FIG. 7 by this operation.

Referring to FIGS. 5 and 8, step 10 is executed with respect only to the "acceptance screen specification" because the received specification revision and the registered specification revisions are the same with respect to other specification names. The data registration means 11 adds the specification revision "R2.1" and the contents of the acceptance screen specification version R2.1. The contents of the specification storage 22 is updated as shown in the FIG. 8 by this operation.

Next, the operation of the data reference means 12 is described.

Referring again to FIG. 4, the operator inputs the data reference command when he refers to the data stored in the configuration storage 21 and the specification storage 22. Receiving the data reference command, the data management device 1 activates the data reference means 12.

Figure 10:
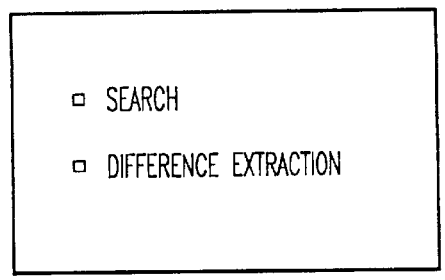
FIG. 10 is an example of a menu displayed on the display device 3 when data is referenced.

Referring to FIG. 9, in step 21, the data reference means 12 displays a menu shown in FIG. 10 on the display device 3. The operator selects one of the menu items by moving the pointing device 5.

In step 22, the data reference means 12 determines whether one of the menu items is selected or not. When one of the menu items is selected, the data reference means 12 executes step 23. When no menu item is selected, the data reference means 12 executes step 24.

In step 23, the data reference means 12 executes the processing corresponding to the selected menu item. If the "search" item is selected, the processing is executed by the search section 13. If the "difference extraction" item is selected, the processing is executed by the difference extraction section 14. After the execution, the data reference means 12 executes step 21 again.

In step 24, the data reference means 12 determines whether an exit instruction is input via the keyboard 4 by the operator or not. If the exit instruction is input, the data reference means 12 terminates its operation. If the exit instruction is not input, the data reference means 12 executes step 22 again.

Next, the operation of the data reference means 12 when the "search" menu item is chosen in step 23 in FIG. 9.

Figure 11:
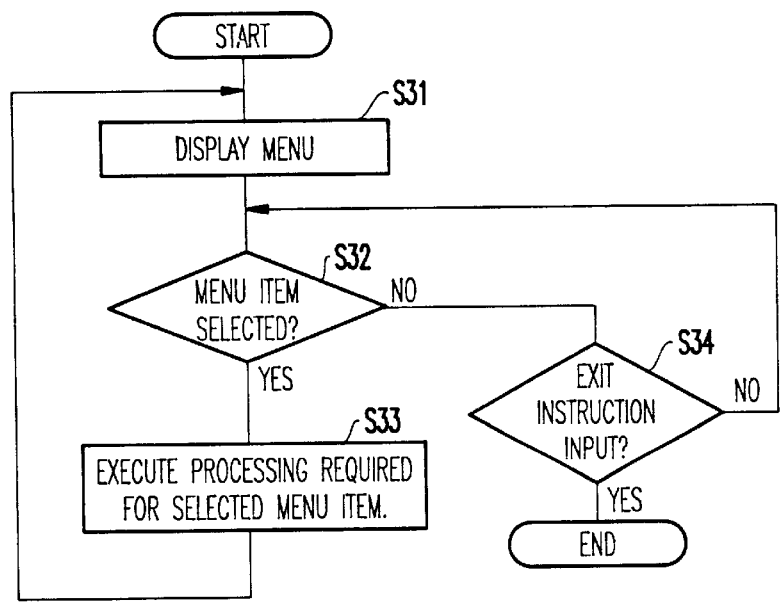
FIG. 11 is a flowchart illustrating the processing of the search section 13.
Figure 12:
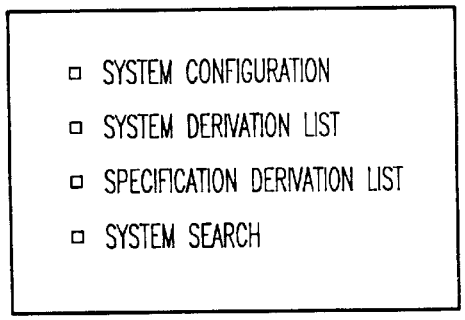
FIG. 12 is an example of a menu displayed in the step 31 in FIG. 11 on the display device 3.

Referring to FIG. 11, in step 31, the search section 13 displays a menu as shown in FIG. 12 on the display device 3.

The "system configuration" means the operation to display the specification names and the specification revisions of a specified software system.

The "system derivation list" means the operation to display all system revisions of a specified software system.

The "specification derivation list" means the operation to display all the revisions of a specification specified by a specification name.

The "system search" means the operation to display the system names and the system revisions of software systems including the source program produced according to a specification specified by the specification name and the specification revision.

In steps 32 to 34, the search section 13 executes the same processing as steps 22 to 24 in FIG. 9, respectively.

Next is described the operation of the search section 13 when the "system configuration" item is selected in step 33 in FIG. 11.

Figure 13:
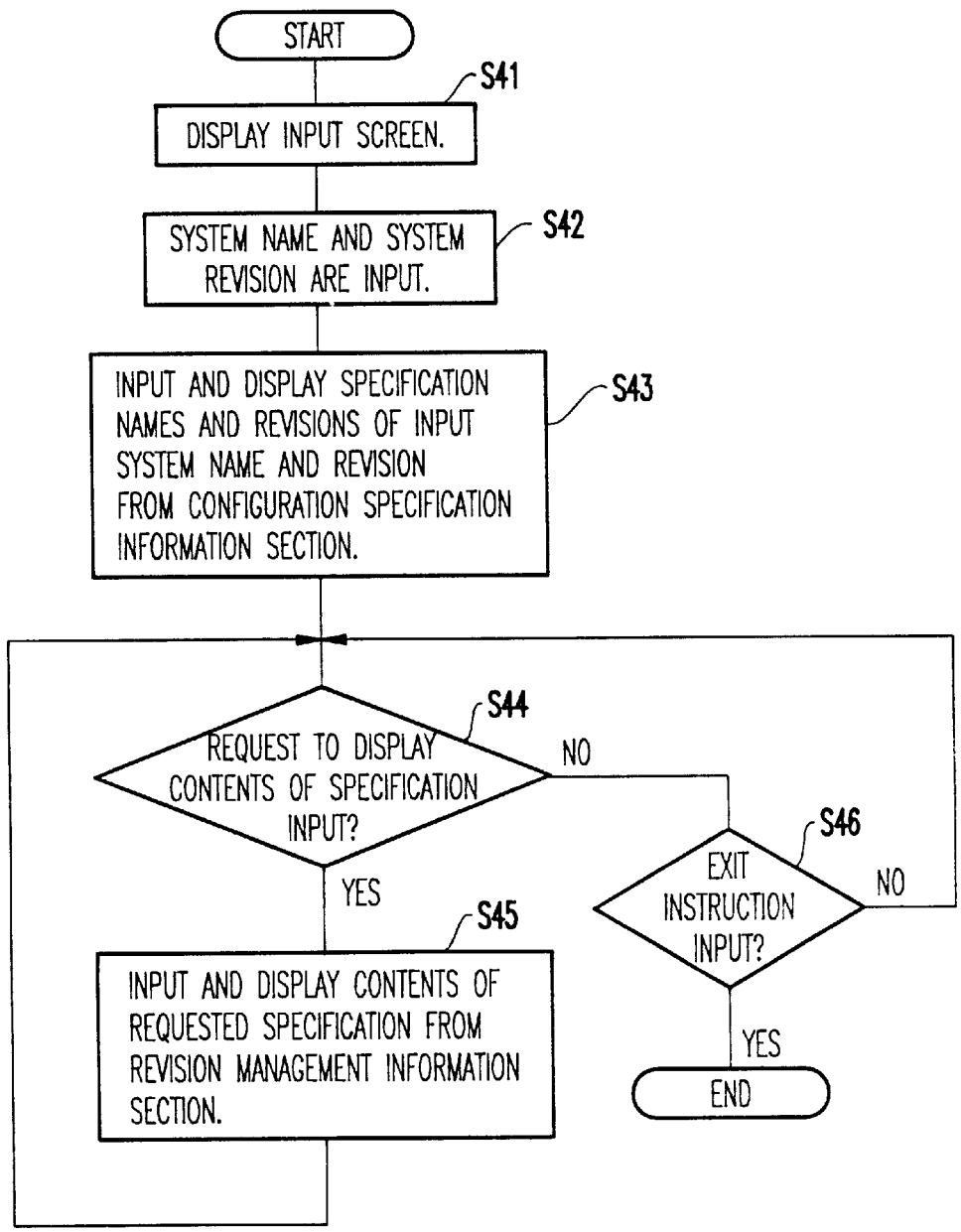
FIG. 13 is a flowchart illustrating the processing of the search section 13 when the menu item "system configuration" is selected.
Figure 14A:
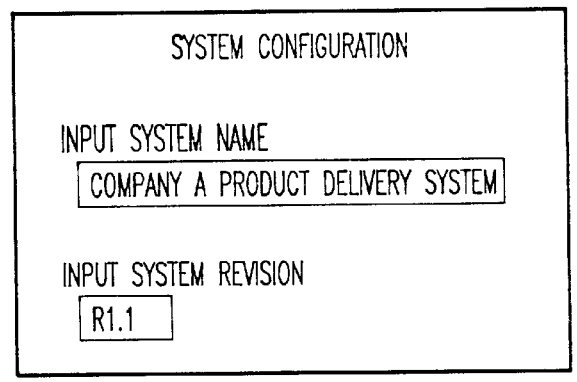
FIGS. 14(a) and 14(b) show examples of screen images displayed in the steps 41 and 43 in FIG. 13, respectively.
Figure 14B:
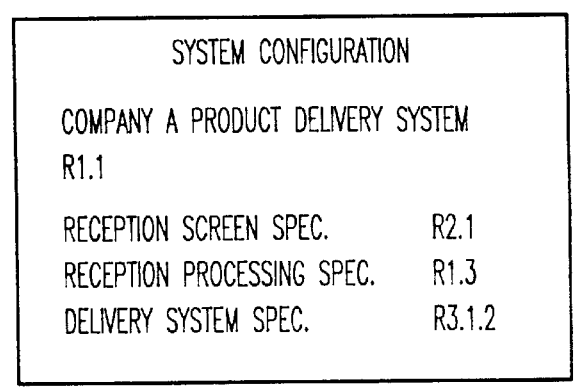

Referring to FIG. 13, in step 41, the search section 13 displays an input screen shown in FIG. 14(*a*) and requests the operator to input a system name.

In step 42, the search section 13 receives a system name and a system revision via keyboard 4 from the operator.

In step 43, the search section 13 reads from the configuration storage 21 the specification names and the specification revisions included in the software system specified by the received system name and system revision. The search section 13 displays the specification names and the specification revisions on the display device 3.

In step 44, the search section 13 determines whether a request to display the contents of the specifications is input by the operator or not. If the request is input, the search section 13 executes step 45. If the request is not input, the search section 13 executes step 46.

In step 45, the search section 45 reads from the specification storage 22 the contents of the requested specification and displays it on the display device 6. After displaying the contents of the specification, the search section 13 executes step 44 again.

In step 46, the search section determines whether an exit instruction is input by the operator or not. If the exit instruction is input, the search section executes step 31 in FIG. 11. If the exit instruction is not input, the search section executes step 44 again.

Referring to FIG. 14(*a*), when the search section 13 receives "company A product delivery system" and "R1.1" as the system name and the system revision, respectively, the search section 13 reads from the configuration storage 21 "reception screen specification R2.1", "reception processing specification R1.3" and "delivery screen specification R3.1.2" as the specification names and the specification revisions.

Referring to FIG. 14(*b*), the specification names and the specification revisions are displayed on the display device 3.

Next is described the operation of the search section 13 when the "system derivation list" item is selected in step 33 in FIG. 11.

Figure 15:
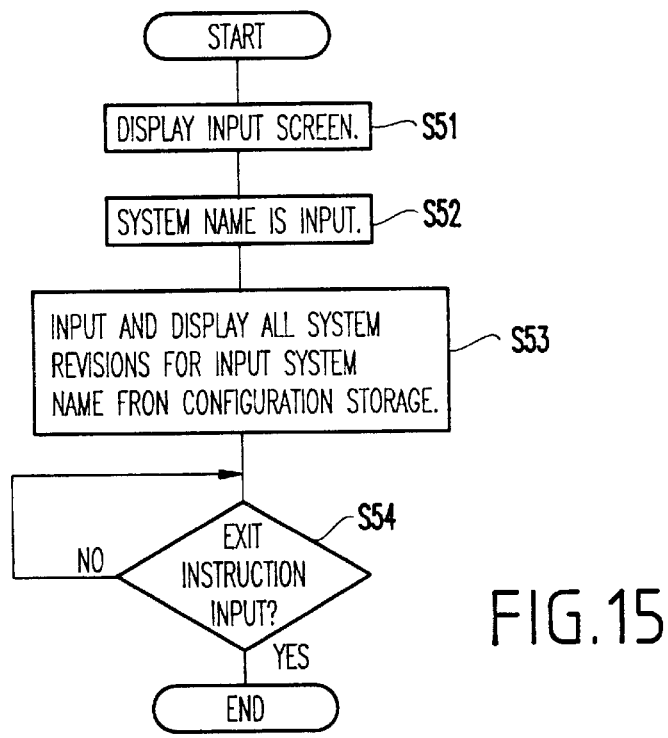
Figure 16A:
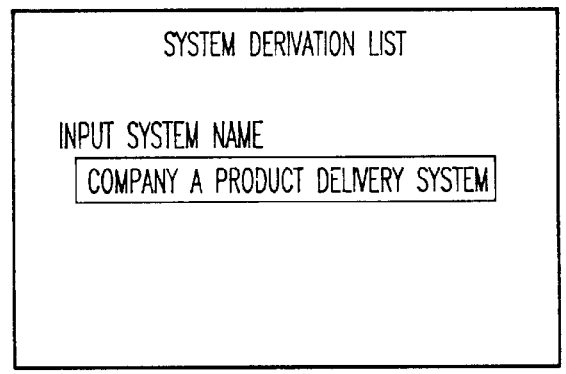
FIGS. 16(a) and 16(b) show examples of screen images displayed in the steps 51 and 53 in FIG. 15, respectively.
Figure 16B:
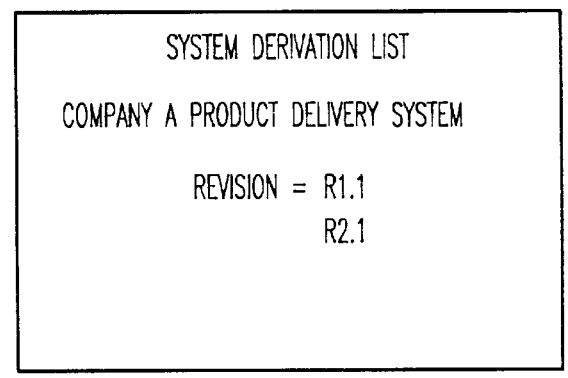

Referring to FIG. 15, in step 51, the search section 13 displays an input screen shown in FIG. 16(*a*) on the display device 3 and requires the operator to input a system name.

In step 52, the search section 13 receives the system name via the keyboard 4 from the operator.

In step 53, the search section 13 read from the configuration storage 21 all system revisions of the received system name. The system revisions are displayed on the display device 3.

In step 54, the search section 13 determines whether an exit instruction is input from the operator or not. If the exit instruction is input, the search section 13 executes the step 31 in FIG. 11. If the exit instruction is not input, the search section 13 executes step 54 again.

Referring to FIG. 16(*a*), when the search section 13 receives "company A product delivery system" as the system name, the search section reads from the configuration storage 21, "R1.1" and "R2.1" as the system revision of the "company A product delivery system".

Referring to FIG. 16(*b*), the search section 13 displays the system revisions on the display device 3.

Next is described the operation of the search section 13 when "the specification derivation list" is selected in step 33 in FIG. 11.

Figure 17:
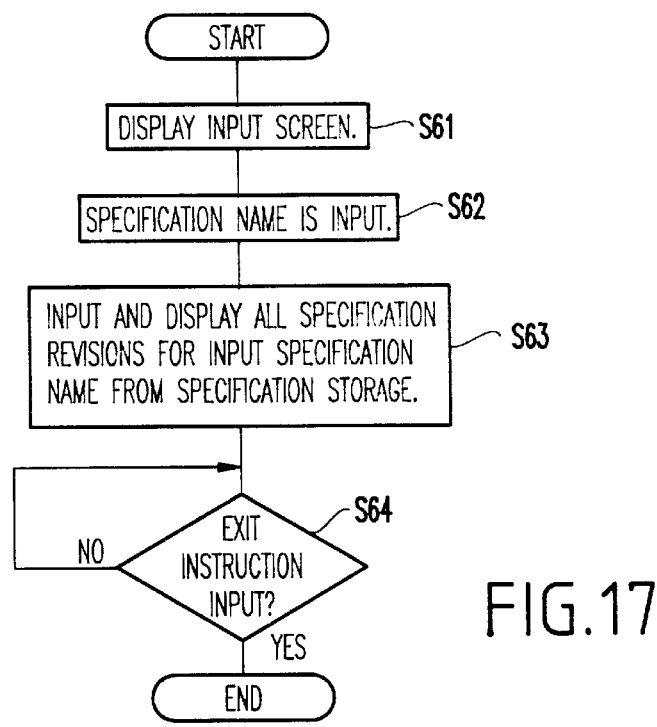
FIG. 17 is a flowchart illustrating the processing of the search section 13 when the menu item "specification derivation list" is selected.

Referring to FIG. 17, in step 61, the search section 13 displays an input screen shown in FIG. 18(*a*) on the display device 3 and request the operator to input a specification name.

In step 62, the search section 13 receives a specification name via the keyboard 6 form the operator.

In step 63, the search section 13 reads from the specification storage 22 all specification revisions of the received specification name. The specification revisions are displayed on the display device 3.

In step 64, the search section 13 determines whether an exit instruction is input from the operator or not. If the exit instruction is input, the search section 13 executes the step 31 in FIG. 11. If the exit instruction is not input, the search section 13 executes step 64 again.

Referring to FIG. 18(*a*), when the search section 13 receives "reception screen specification" as the specification name, the search section reads from the configuration storage 21 "R1.1", "R2.1" and "R3.1" as the specification revisions of the "reception screen specification".

Referring to FIG. 18(*b*), the search section 13 displays the revisions on the display device 3.

Next is described the operation of the search section 13 when the "system search" item is selected in step 33 in FIG. 11.

Figure 20A:
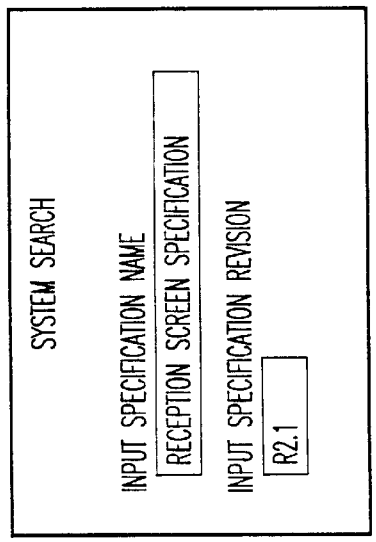
FIGS. 20(a) and (b) show examples of screen images displayed in the steps 71 and 73 in FIG. 19, respectively.
Figure 20B:
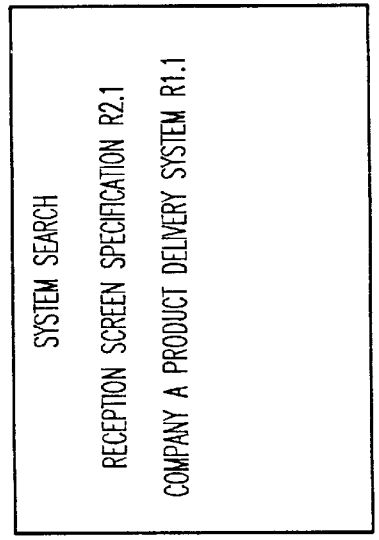
Figure 19:
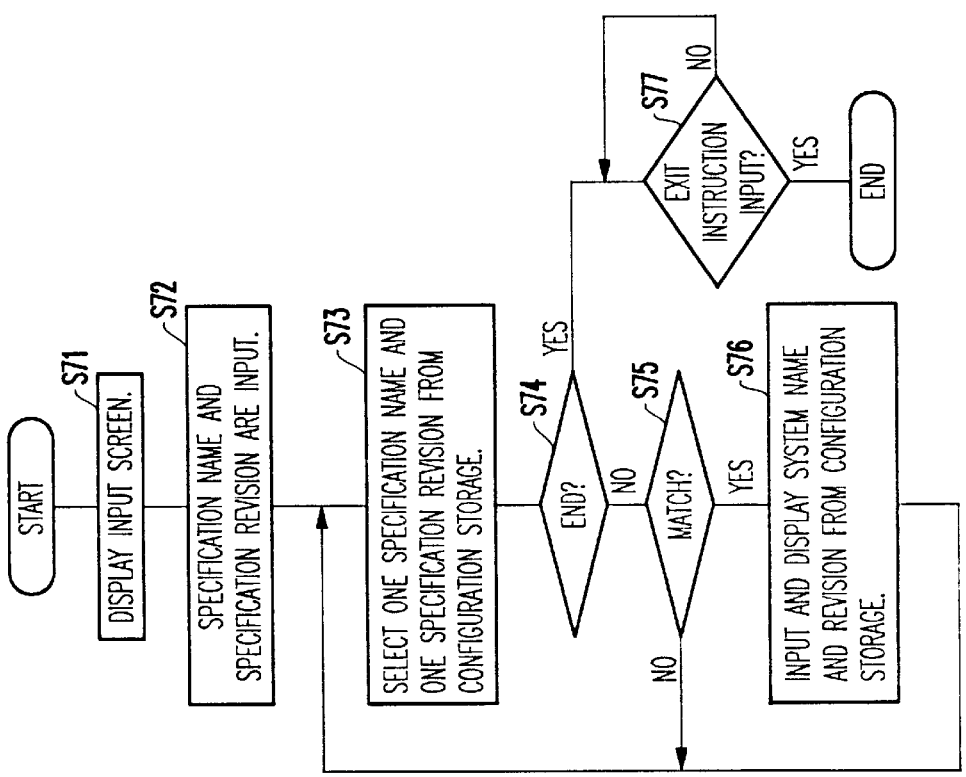
FIG. 19 is a flowchart illustrating the processing of the search section 13 when the menu item "system search" is selected.

Referring to FIG. 19, in step 71, the search section displays an input screen shown in FIG. 20(*a*) and requests the operator to input a specification name and a specification revision.

In step 72, the search section 13 receives the specification name and the specification revision via the keyboard 6 from the operator.

In step 73, the search section 13 selects one combination of a specification name and a specification revision in the configuration storage 21.

In step 74, the search section 13 determines whether the step 75 to 76 is executed with respect to all specification names in configuration storage 21. If so, the search section 13 executes step 77. If not, the search section executes step 75.

In step 75, the search section 13 determines whether the selected specification name and specification revision are the same as those received in the step 72 or not. If they are the same, the search section 13 executes the step 76. If they are not the same, the search section 13 executes the step 73 again.

In step 76, the search section 13 reads from the configuration storage 21 the system name and the system revision corresponding to the selected specification name and the specification revision. The system name and the system revision are displayed on the display device 3. After executing step 76, the search section 13 executes step 73 again.

Referring to 20(*a*), when the search section 13 receives the "reception screen specification" and "R1.1" as the specification name and the specification revision, respectively, the search section 13 read from the configuration storage "company A product delivery system" and "R1.1" as the system name and the system revision corresponding to the "reception screen specification" version "R1.1".

Referring to FIG. 20(*b*), the search section 13 displays the system name and the system revision on the display device 3.

Next, the operation of the difference extraction section 14 is described. The difference extraction section 14 is activated when the "difference extraction" item is selected in step 23 in FIG. 9.

Figure 21:
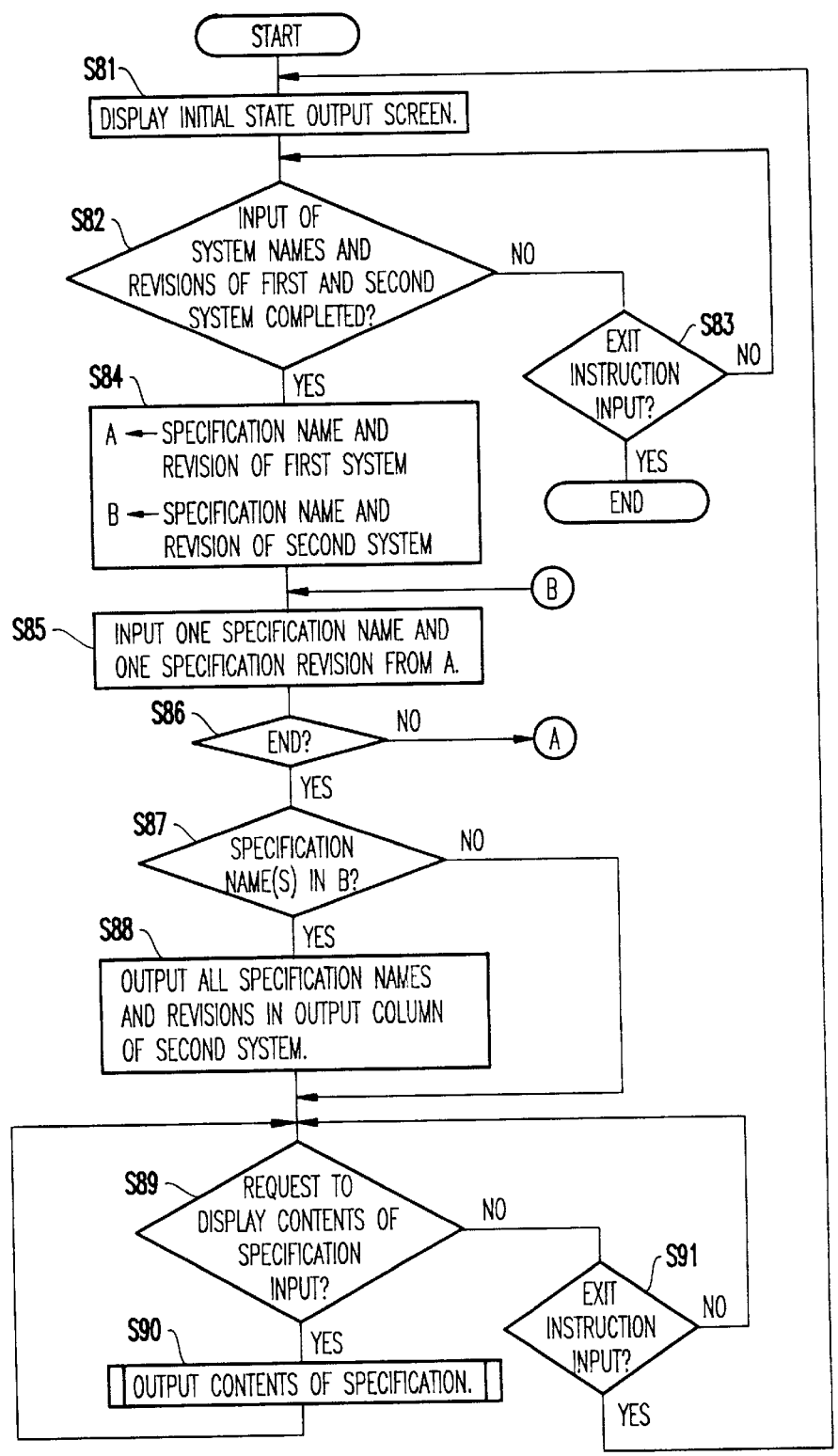
FIG. 21 is a flowchart illustrating the processing of the difference extraction section 14.

Referring to FIG. 21, in the step 81, the difference extraction section 14 displays an initial state screen and requests the operator to input a first system name, a first system revision, a second system name and a second system revision. The initial state screen only includes "DIFFERENCE EXTRACTION", "FIRST SYSTEM" and "SECOND SYSTEM" of the display items in the screen shown in FIG. 23.

In step 82, the difference extraction section 14 receives the first and second system names and the first and the second system revisions. If an exit instruction is input by the operator in the step 82, the difference extraction section 14 terminates its operation (the step 83). When the input of the first and second system names and revisions is completed, the difference extraction section 14 executes step 84. Hereinafter, a system specified by the first system name and the first system revision is referred to as a first system. A system specified by the second system name and the second system revision is referred to as a second system.

In step 84, the difference extraction section 14 reads the specification names and the specification revisions of the first and second systems into storage A and B, respectively.

In step 85, the difference extraction section 14 selects one set of a specification name and a specification revision (e.x., "reception screen specification, R3.1") from the storage A. The selected specification name and specification revision are removed from the storage A.

In step 86, the difference extraction section 14 determines whether the selection in step 85 is failed or not. If the selection is failed because there is no specification name remains in the storage A, the difference extraction section 14 executes step 87. If the selection is successful, the difference extraction section 14 executes step 92 in FIG. 22.

Figure 22:
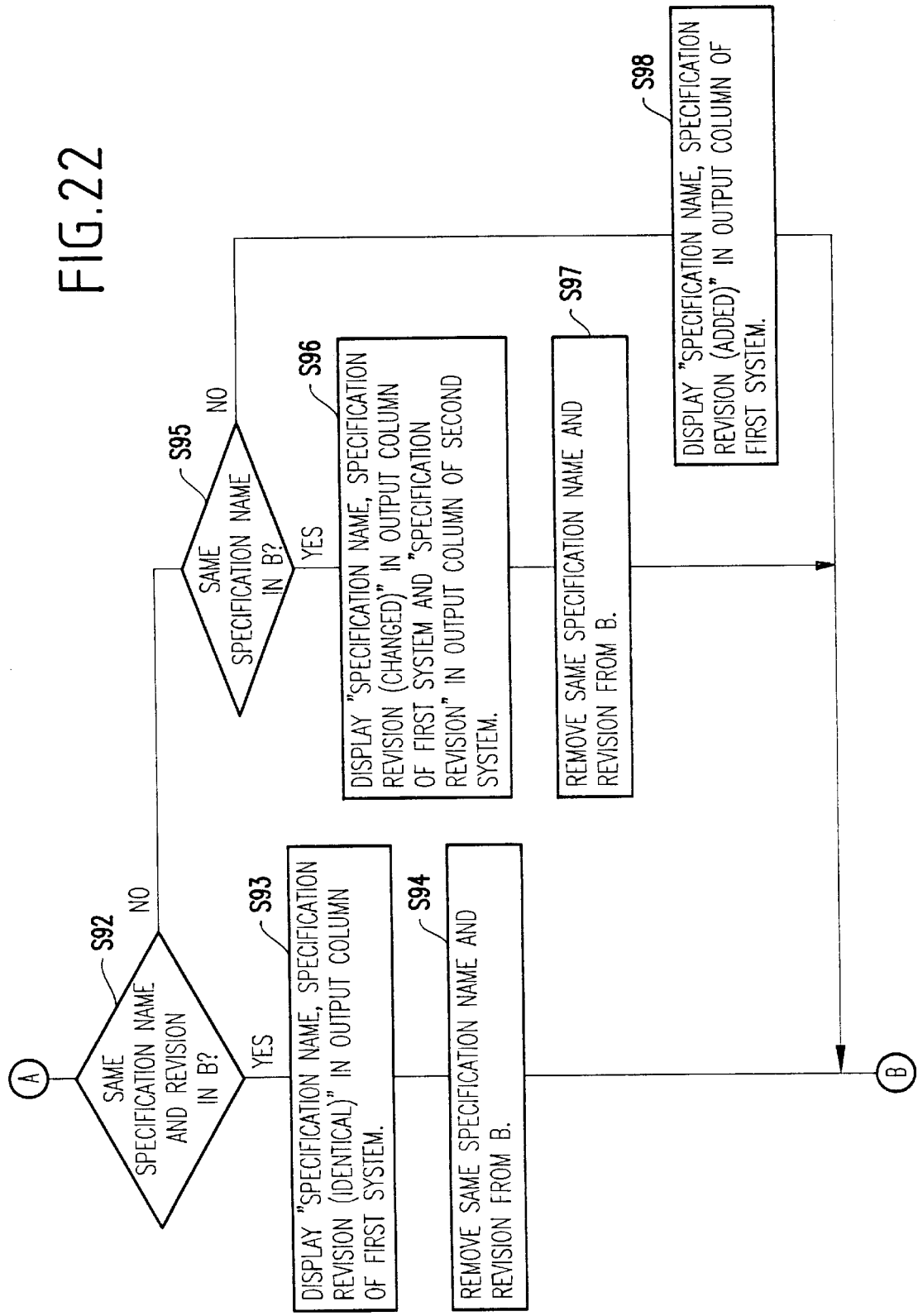
FIG. 22 is a flowchart illustrating the processing of the difference extraction section 14.

Referring to FIG. 22, in step 92, the difference extraction section 14 determines whether the selected specification of the selected specification revision exists in the storage B. If it exists, the difference extraction section 14 executes the step 93. If it does not exist, the difference extraction section 14 executes step 95.

In step 93, the difference extraction section 14 displays the selected specification name and revision with a comment "(identical)" in the output column of the first system.

In step 94, the difference extraction section 14 removes the selected specification name and specification revision from the storage B. After the execution of step 94, the difference execution section 14 executes step 85 again.

In step 95, the difference extraction section 14 determines whether the selected specification name exists in the storage B. If it exists, the difference specification section 14 executes step 96. If it does not exist, the difference execution section 14 executes the step 98.

In step 96, the difference specification section 14 displays the selected specification name and its specification revision in the storage A with a comment "(CHANGED)" in the output column of the first system. The difference extraction section 14 displays the specification revision of the selected specification name in the storage B in the output column of the second system.

In step 97, the difference extraction section 14 removes the selected specification name and its specification revision from the storage B. After the execution of step 97, the difference extraction section 14 executes the step 85 in FIG. 21.

In step 98, the difference extraction section 14 displays the selected specification name and the selected specification revision with a comment "(ADDED)" in the output column of the first system. After the execution of the step 98, the difference execution section 14 executes step 85 in FIG. 21.

Referring again to FIG. 21, in step 87, the difference extraction section 14 determines whether any specification name it exists in the storage B or not. If exists, the difference extraction section 14 executes step 88. If it does not exist, the difference extraction section 14 executes step 89.

In step 88, the difference extraction section 14 displays all specification names and their specification revisions in the output column of the second system.

In step 89, the difference extraction section 14 determines whether the operator inputs a request to display the contents of the specification or not. If the operator inputs, the difference extraction section 14 executes step 90. If the operator does not so request, the difference extraction section 14 executes step 91.

In step 90, the difference extraction section 14 displays the contents of the specification specified by the operator. The operator specifies one of the specifications displayed on the display device 3 by using the pointing device 5. The detailed operation of the difference extraction section 14 in step 90 is described below. After the execution of step 90, the difference extraction section 14 executes step 89 again.

In step 91, the difference extraction section 14 determines whether an exit instruction is input by the operator or not. If the exit instruction is input, the difference extraction section 14 terminates its operation and the data reference means 12 executes step 21 in FIG. 9.

Next is described an example of the operation of the difference extraction section 14.

If, for example, the contents of the configuration storage 21 are as shown in FIG. 2 and if the "company A product delivery system, R2.1" and the "company B product delivery system, R1.1" are input as the first and second system names and revisions, "reception screen specification, R3.1", "reception processing specification, R2.3", "delivery screen specification, R3.1.2", "car allocation screen specification, R1.1" and "car allocation map specification, R1.1" are stored in the storage A, while "reception screen specification, R3.1", "reception processing specification, R1.4," "acceptance screen specification, R1.1" and "delivery screen specification, R3.1.2" are stored in the storage B.

Figure 23:
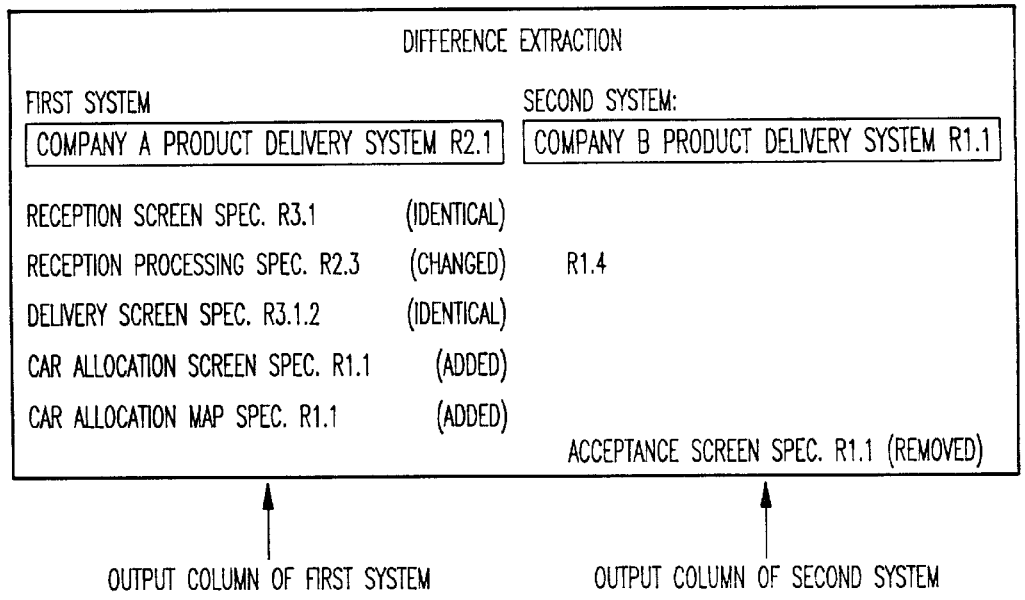
FIG. 23 illustrates an example of the output screen output by the difference extraction section 14.

In the first stage, the "reception screen specification R3.1" is selected in step 85. In this stage, "reception screen specification R3.1 (IDENTICAL)" is displayed as shown in FIG. 23 in step 93 because the same specification name of the same specification revision exists in the storage B. The "reception screen specification R3.1" is removed from the storage A and B in steps 85 and 94, respectively.

In the second stage, the "reception processing specification R2.3" is selected in the step 85. In this stage, "reception processing specification R2.3 (CHANGED)" is displayed as shown in FIG. 23 in step 96 because the same specification name of a different specification revision "reception processing specification R1.4" exists in the storage B. Simultaneously, "R1.4" is displayed in the output column of the second system.

The "reception processing specification R2.3" and "reception screen specification R1.4" is removed from the storage A and B in steps 85 and 97, respectively.

In the third stage, the "delivery screen specification R3.1.2" is selected in step 85. In this stage, "delivery screen specification R3.1.2 (IDENTICAL)" is displayed as shown in FIG. 23 in step 93 because the same specification name of the same specification revision exists in the storage B. The "delivery screen specification R3.1.2" is removed from the storage A and B in the steps 85 and 94, respectively.

In the fourth stage, the "car allocation screen specification R1.1" is selected in the step 85. In this stage, "car allocation screen specification R1.1 (ADDED)" is displayed as shown in FIG. 23 in the step 98 because the specification name "car allocation screen specification" does not exists in the storage B. The "car allocation screen specification R1.1" is removed form the storage A in the step 98.

In the fifth stage, the "car allocation map specification R1.1" is selected in step 85. In this stage, "car allocation map specification R1.1 (ADDED)" is displayed as shown in FIG. 23 in step 98 because the same specification name does not exists in the storage B. The "car allocation map specification R1.1" is removed from the storage A in the step 98.

In the sixth stage, the difference extraction section 14 executes step 88 because no specification name exists in the storage A and "acceptance screen specification R1.1" exists in the storage B. In step 88, "acceptance screen specification R1.1" is displayed in the output column of the second system as shown in FIG. 23.

Next is described the detailed operation of the difference extraction section 14 in step 90.

Figure 24:
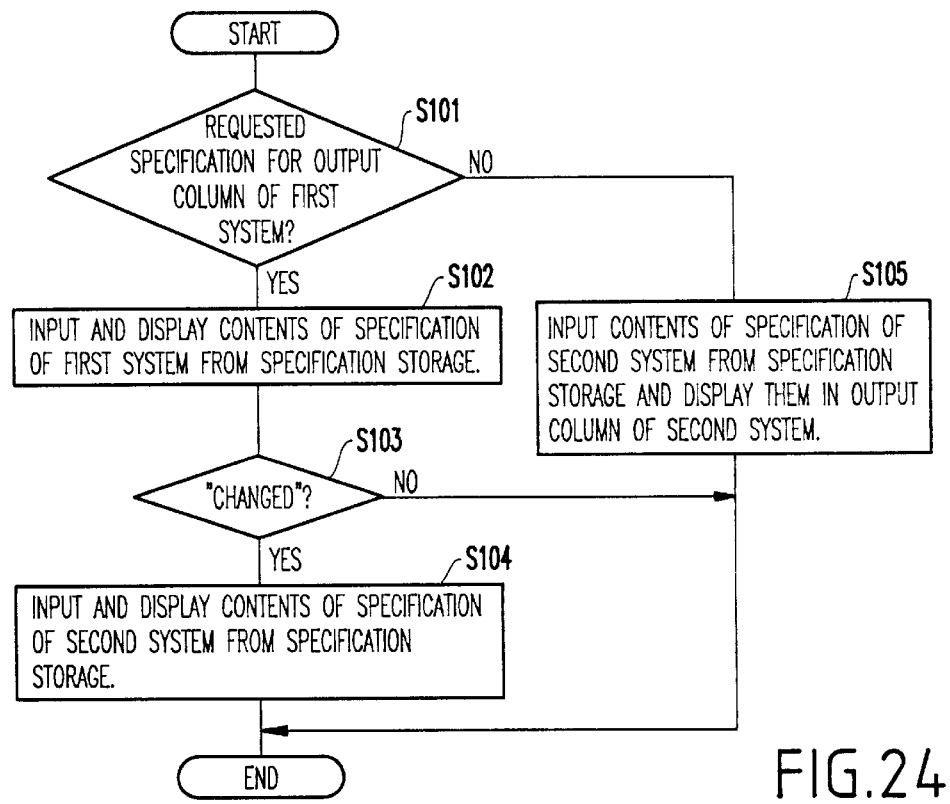
FIG. 24 is a flowchart illustrating the process for displaying the contents of a specification carried out by the difference extraction section 14.

Referring to FIG. 24, in step 101, the difference extraction section 14 determines whether the specified specification is in the output column of the first system. If the specification is in the output column of the first system, the difference extraction section 14 executes step 102. If the specified specification is in the output column of the second system, the difference extraction section 14 executes step 105.

In step 102, the difference extraction section 14 reads the contents of the specified specification from the specification storage 22 and displays it in the output column of the first system.

In step 103, the difference extraction section 14 determines whether the specified specification is a modified version of a specification of the second system or not. That is, the difference extraction section 14 determines whether the comment "(CHANGED)" is displayed on the right of the specified specification name and specification revision. If the comment "(CHANGED)" is displayed, the difference extraction section 14 executes step 104. If the comment "(CHANGED)" is not displayed, the difference extraction section 14 terminates the operation of step 90.

In step 104, the difference extraction section 14 reads from the specification storage 22 the contents of specification in the storage B with the same specification name as that of the specified specification of the first system. The difference extraction section 14 displays the contents of the specification in the output column of the second system.

In step 105, the difference extraction section 14 reads the contents of the specified specification from the specification storage 22 and displays it in the output column of the second system. After the execution of step 105, the difference extraction section 14 ends its operation of step 90.

Next, the advantages of the first embodiment is described.

First, the operator can examine the correspondence between software systems and specifications due to the search section 13, the configuration storage 21 and the specification storage 22. This search facility makes it possible for the operator to identify the specifications composing a specific software system, and to identify software systems that include a specific specification. The search facility also makes it possible to display all the revisions of a specific system name or specification.

Second, the operator can examine the contents of the specification soon after the search processing because the specification storage 22 stores the contents of the specification.

Third, the specification storage 22 does not take up large space in the storage device 2. This advantage is due to the division of the specification into the units corresponding to source programs. When a source program is modified, only the specification corresponding to the modified source program is added in the specification storage 22.

Fourth, the operator can easily identify the difference between two software system. This facility is due to the specification name and the specification revision given to each specification, and to the difference extraction section 14.

Next, modifications of the first embodiment is described.

First, the contents of the specification can be removed from the specification storage 22.

Second it is possible to modify the displayed image shown in FIGS. 10, 12, 14(a), 14(b), 16(a), 16(b), 18(a), 18(b), 20(a), 20(b) and 23.

Third, the first embodiment is preferably applied to a system in which a source program is automatically produced from a specification. In this kind of system, it is easy to store the contents of the specification in the specification storage 22 because the specifications are not drafted on paper but coded as computer readable format.

Next, the second embodiment of the present invention is described.

Figure 25:
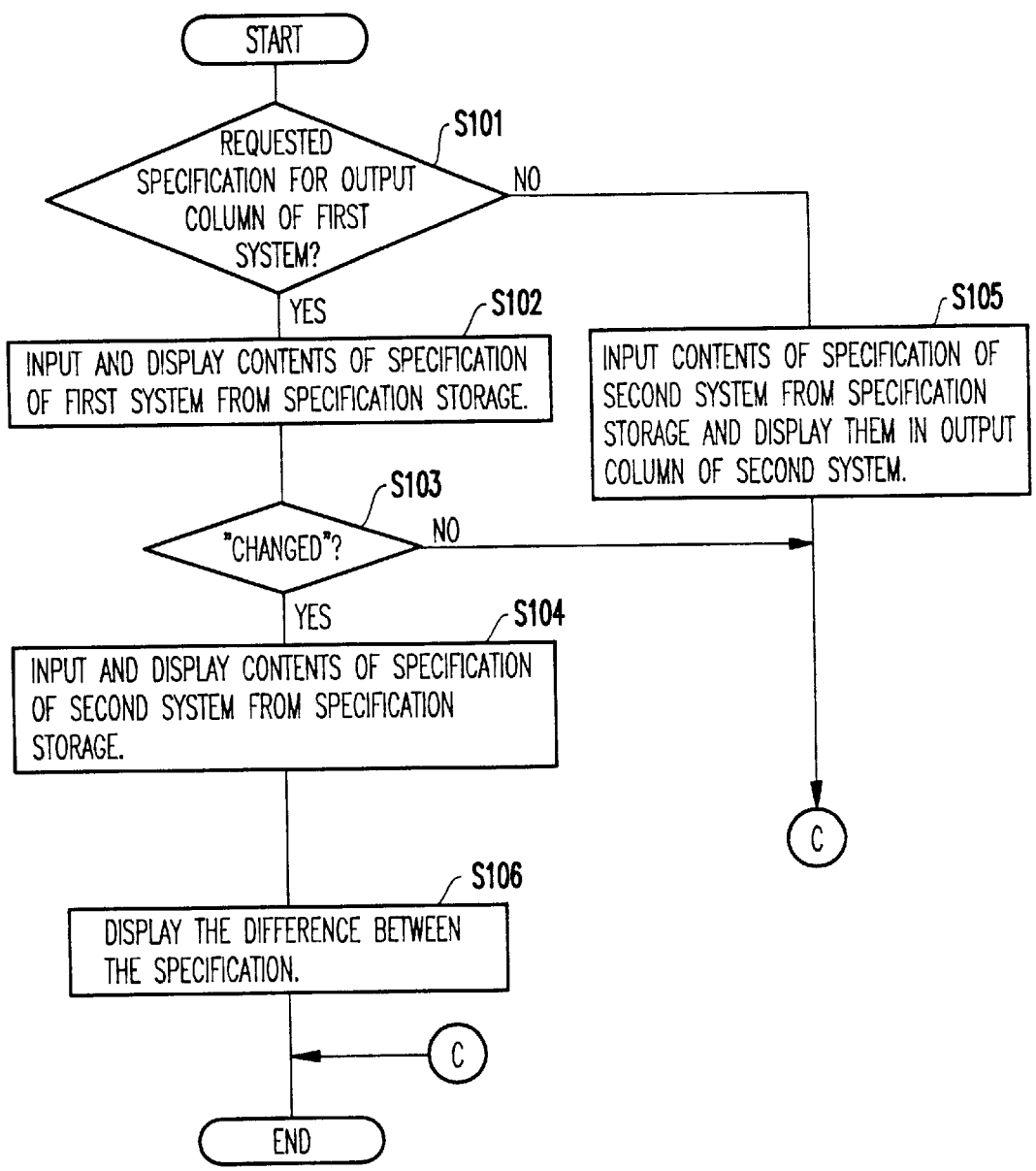
FIG. 25 is a flowchart illustrating the processing of the second embodiment of the present invention.

Referring to FIG. 25, the feature of the second embodiment resides in step 106 executed after the step 104 in FIG. 24. In step 106, the difference between the specifications of the first and second systems is identified. The detailed operation of the difference extraction section 14 in step 106 is described below.

Figure 26:
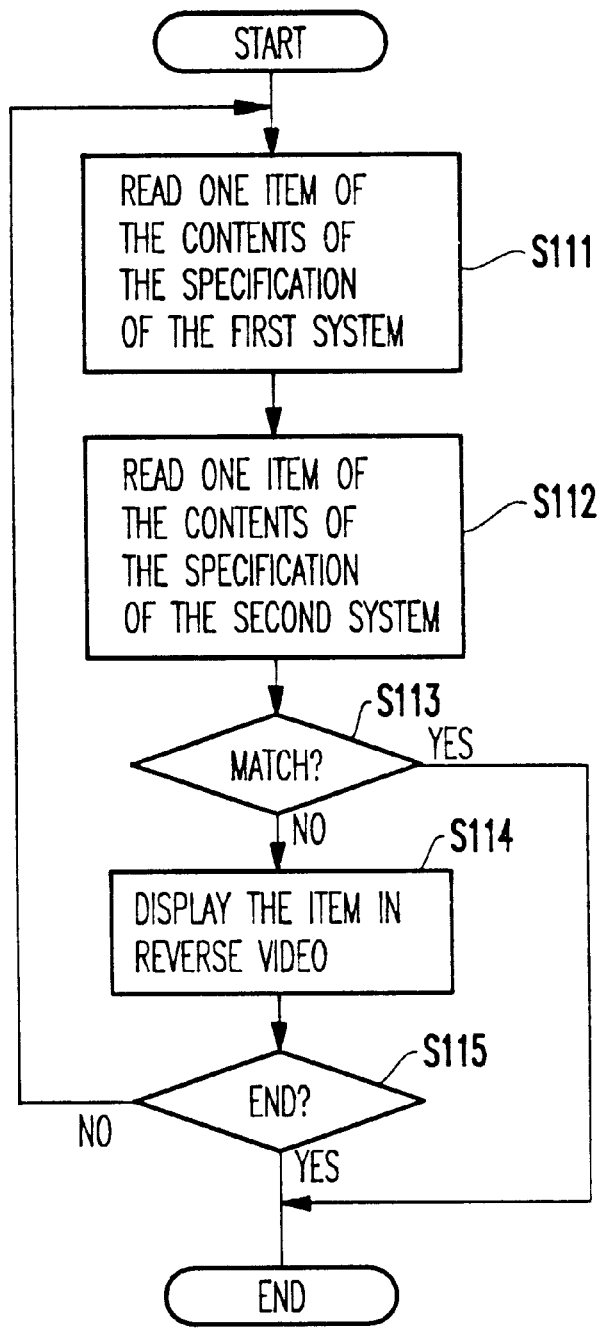
FIG. 26 is a flowchart illustrating the detailed processing in the step 106 in FIG. 25.

Referring to FIG. 26, in step 111, the difference extraction section reads one item of the contents of the specification of the first system.

In step 112, the difference extraction section 14 reads one item of the contents of the specification of the second system.

In step 113, the difference extraction section 14 determines whether the items read in steps 111 and 112 are the same or not. If they are the same, the difference extraction section 14 executes step 115. If they are not the same, the difference extraction section 14 executes step 114.

In step 114, the difference extraction section 14 displays the item in the second system in reverse video.

In step 115, the difference extraction section 14 determines whether the step 111 to 114 is done with respect to all items of the contents of the specification or not. If the steps are executed with respect to all items, step 106 terminates. If the steps are not executed with respect to all items, the difference extraction section 14 executes step 111 again.

Figure 27A:
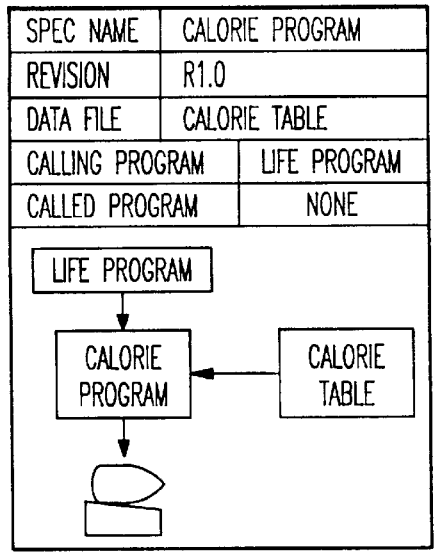
FIGS. 27(a)–27(c) illustrates an exemplary process of the second embodiment of the present invention.
Figure 27B:
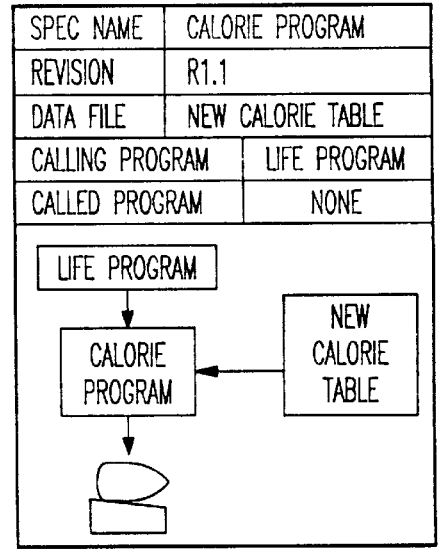
Figure 27C:
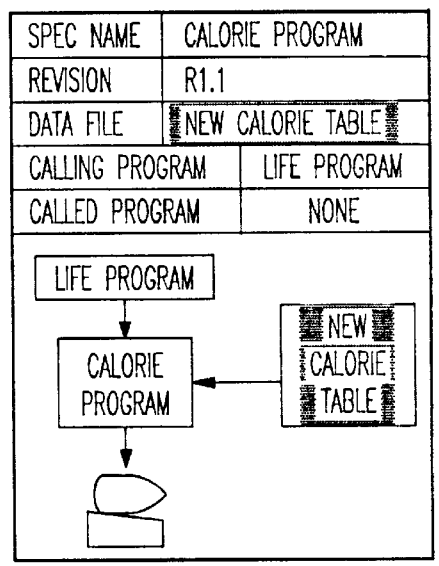

Referring to FIGS. 27(a) and 27(b), when the contents of the specifications of the first and second systems are as shown in FIGS. 27(a) and 27(b), respectively, the "data file" items are different from each other. Therefore, the difference extraction section displays the "data file" item of the second system in reverse video as shown in FIG. 27(c).

According to the second embodiment, the operator can easily examine the difference of two systems.

The second embodiment is preferably applied to a system in which a source program is produced automatically from a specification. In this kind of system, the comparison of the items is easy because programmers draft specifications in a standard format.

Next, examples of the specifications applicable to the present invention are described.

Figure 28:
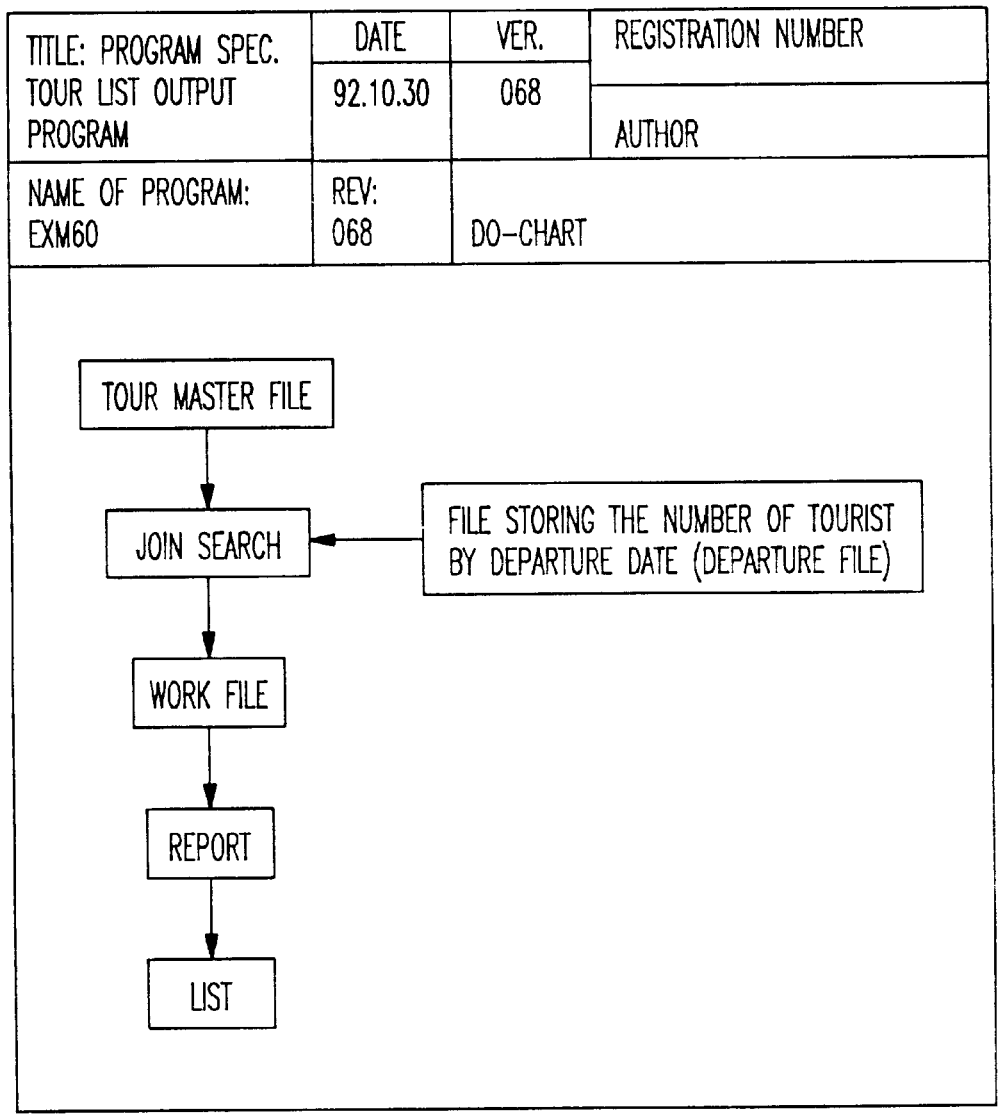

Referring to FIG. 28 showing an example of a program specification. The program specification, the describes the operation of a program. The program specification may include a data flow diagram.

Referring to FIG. 29 showing an example of an action definition specification, the action definition specification defines the operation of each action. An "action" is a command executed in a system in which a source program is produced from a specification.

Referring to FIG. 30 showing another example of the program specification, this program specification describes the correspondence between items in a file and items in an output datum.

Referring to FIG. 31 showing an example of a file specification, the file specification describes the contents and formats of records in files.

Referring to FIG. 32 showing an example of a screen specification, the screen specification describes the format of a displayed image.

The present invention can be applied to other kinds of specifications not shown in figures such as a database specification, a structure definition specification, a procedure specification, an input/output specification, a format specification, or a data specification.

The database specification describes the format of data stored in a database. The structure definition specification describes the structure of a software system. The procedure specification describes the operation of each procedure. The input/output specification describes the format and protocol of the input/output data. The format specification describes a format printed on a printer. The data specification describes the format and structure of data.

The present embodiments are therefore, to be considered in all respects as illustrative and not restrictive, the scope of the invention being indicated by the appended claims rather than by the foregoing description and all changes which come within the meanings and range of equivalency of the claims are therefore intended to the embraced therein.

What is claimed is:

1. A software managing method implemented in a software management device, said software management device being connected to an input device, an output device and a memory, said memory including a configuration storage, said method comprising the steps of:

storing in said configuration storage a system identifier and a specification identifier corresponding to said system identifier, said specification identifier corresponding to said system identifier when a source program identified by said specification identifier is included in a system identified by said system identifier;

receiving a data reference command from said input device; and outputting specification information to said output device in response to said data reference command, said system identifier comprising information of system revisions for clients to which the system has been released, said specification identifier comprising information of specification revisions of each specification corresponding on a one-to-one basis to source programs constituting each of said system revisions, wherein said specification comprises information for producing a source code of said source program.

2. A method according to claim 1, said step for outputting comprises the steps of:

receiving a system identifier from said input device;

reading from said configuration storage a specification identifier corresponding to said system identifier; and outputting said specification identifier to said output device.

3. A method according to claim 1 wherein said system identifier includes a system name and a system revision, said step for outputting comprises the steps of:

receiving a system name from said input device;

reading from said configuration storage a system identifier including said system name; and outputting a system revision included in said system identifier to said output device.

4. A method according to claim 1, wherein said memory has a specification storage for storing said specification identifier, said specification identifier includes a specification name and a specification revision, said step for outputting comprises the steps of:

receiving a specification name from said input device;

reading from said specification storage a specification identifier including said specification name; and outputting a specification revision included in said specification identifier to said output device.

5. A method according to claim 1, said step for outputting comprising steps of:

receiving a specification identifier;

reading from said configuration storage a system identifier corresponding to said specification identifier; and outputting said system identifier to said output device.

6. A method according to claim 1, said step for outputting comprising the steps of:

receiving first and second system identifiers of first and second software systems from said input device;

reading from said configuration storage a first group of specification identifiers corresponding to said first system identifier;

reading from said configuration storage a second group of specification identifiers corresponding to said second system identifier; and comparing specification identifiers included in said first and second groups for determining a difference between said first and second groups; and outputting said difference between said first and second groups to said output device.

7. A method according to claim 6, wherein said step for outputting comprises the step of:

outputting to said output device a specification identifier included in both said first and second groups.

8. A method according to claim 7, wherein said step for outputting a specification identifier comprises the step of:

outputting to said output device a comment stating that said first and second software systems include identical source programs.

9. A method according to claim 6, wherein said step for outputting comprises the step of:

outputting to said output device a specification identifier included only in said first group.

10. A method according to claim 9, wherein said step for outputting a specification identifier comprises the step of:

outputting to said output device a comment stating that a source program corresponding to said specification identifier is added to said first software system.

11. A method according to claim 6, wherein said step for outputting comprises the step of:

outputting to said output device a first specification identifier in said first group when said second group includes a specification identifier including the same specification name as said first specification identifier but including a different specification name.

12. A method according to claim 11, wherein said step for outputting a first specification identifier comprises the step of:

outputting to said output device a comment stating that said first and second software systems include different versions of a source program.

13. A method according to claim 1, wherein said memory has a specification storage for storing said specification identifier and a content of a specification identified by said specification identifier, said step for outputting comprises a steps of:

reading from said specification storage the content of a specification; and outputting said content to said output device.

14. A software management device comprising:

a storage device having a configuration storage and a specification storage, said configuration storage storing a system name and system revisions for clients to which the system has been released and storing specification names and specification revisions corresponding on a one-to-one basis to source programs constituting each system revision of said system revisions, said specification storage storing a specification name and specification revisions of each specification, wherein said specification comprises information for producing a source code of said source programs;

an input device;

an output device;

data registration means for registering data in said configuration storage and said specification storage according to input information from said input device; and data reference means for outputting a content of said configuration storage and said specification storage according to data reference requests from said input device.

15. A software management device according to claim 14, wherein said data reference means references a name and revision of the specification constituting the first software system identified by the system name and revision specified in a data reference request from said input device and the second software system identified by the system name and revision specified in the request to output the difference in the name and revision of the specifications constituting the first and second software systems.

16. A software management device comprising:
a storage device having a configuration storage and a specification storage, said configuration storage storing a system name and system revisions for clients to which the system has been released and storing specification names and specification revisions corresponding on a one-to-one basis to source programs constituting each system revision of said system revisions, said specification storage storing a specification name, specification revisions of each specification, and contents of each specification, wherein said specification comprises information for producing a source code of said source programs;
an input device;
an output device;
data registration means for registering data in said configuration storage and said specification storage according to input information from said input device; and
data reference means for outputting a content of said configuration storage and said specification storage according to data reference requests from said input device.

17. A software management device according to claim 16, wherein said data reference means references said name and revision of the specification constituting the first software system identified by the system name and revision specified in a data reference request from said input device and the second software system identified by the system name and revision specified in the request to output the difference in said name, revision, and contents of the specifications constituting the first and second software systems.

18. A software managing method implemented in a software management device, said software management device being connected to an input device, an output device and a memory, said memory including a configuration storage and a specification storage, said method comprising the steps of:
receiving a data registration command from said input device for registering a software system;
storing in said configuration storage a system identifier and at least one specification identifier corresponding to said system identifier input from said input device; and
storing in said specification storage a content of a specification identified by said specification identifier, the content of the specification stored in said specification storage being linked to the specification identifier stored in said configuration storage,
said system identifier comprising information of system revisions for clients to which the system has been released,
said specification identifier comprising information of specification revisions of each specification corresponding on a one-to-one basis to source programs constituting each of said system revisions, wherein said specification comprises information for producing a source code of said source program.

19. The software managing method recited in claim 18 wherein the step of receiving a data registration command further includes the step of prompting the user to input a system configuration of the software system and the content of the specification.

20. The software managing method recited in claim 19 wherein the step of prompting the user includes prompting for input of a system revision identifier and prompting for input of a specification revision identifier, and wherein the step of storing in said configuration storage includes storing the system revision with said system identifier and storing the specification revision with said specification identifier.

21. The software managing method recited in claim 20 further comprising the steps of:
determining whether a same system identifier as a user input system identifier has been previously registered in said configuration storage; and
registering the user input system identifier by storing the user input system identifier in said configuration storage if not previously registered in said configuration storage.

22. The software managing method recited in claim 21 further comprising the steps of:
determining whether a same specification identifier as a user input specification identifier has been previously registered in said configuration storage; and
registering the user input specification identifier by storing the user input specification identifier in said configuration storage if not previously registered in said configuration storage.

23. The software managing method recited in claim 22 further comprising the steps of:
determining whether a same specification revision as a user input specification revision has been previously registered in said configuration storage; and
registering the user input specification by storing the user input content of the specification in said specification storage if not previously registered in said configuration storage.

24. A software managing method implemented in a software management device, said software management device being connected to an input device, an output device and a memory, said memory including a configuration storage, said method comprising the steps of:
receiving a data registration command from said input device and registering data in said configuration storage of said memory according to information input from the input device; and
storing in said configuration storage a system identifier and a specification identifier corresponding to said system identifier when a source program identified by said specification identifier is included in a system identified by said system identifier,
said system identifier comprising information of system revisions for clients to which the system has been released,
said specification identifier comprising information of specification revisions of each specification corresponding on a one-to-one basis to source programs constituting each of said system revisions, wherein said specification comprises information for producing a source code of said source program.

25. The software managing method as in claim 1, wherein said specification comprises a statement of data available from processing and required outputs.

* * * * *